US012718185B2

(12) United States Patent
O'Gorman et al.

(10) Patent No.: US 12,718,185 B2
(45) Date of Patent: Aug. 25, 2026

(54) SYSTEM AND METHOD OF TRACKING MULTIPLE ELECTRIC VEHICLE SUPPLY EQUIPMENT IN A SHIPMENT

(71) Applicant: Ford Global Technologies, LLC, Dearborn, MI (US)

(72) Inventors: Ryan O'Gorman, Beverly Hills, MI (US); Peter J. Nikolajevs, Dearborn, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/048,344

(22) Filed: Feb. 7, 2025

(65) Prior Publication Data

US 2026/0236880 A1 Aug. 13, 2026

(51) Int. Cl.
*G06Q 10/0833* (2023.01)
*B60L 53/30* (2019.01)

(52) U.S. Cl.
CPC ........ *G06Q 10/0833* (2013.01); *B60L 53/305* (2019.02)

(58) Field of Classification Search
CPC .... G06Q 30/0284; G06Q 10/02; G06Q 50/30; H04W 4/023
USPC .......................................................... 705/333
See application file for complete search history.

(56) References Cited

U.S. PATENT DOCUMENTS 8,078,485 B1 12/2011 Kraehmueller et al.
9,633,237 B2 4/2017 Heine et al.
10,339,619 B2 7/2019 Muirhead
2009/0172035 A1 7/2009 Lessing et al.
2010/0019905 A1 1/2010 Boddie et al.
2016/0137087 A1* 5/2016 Haas ....................... B60L 53/66 320/109
2017/0032302 A1 2/2017 Lete et al.
(Continued)

FOREIGN PATENT DOCUMENTS

KR 20200049771 A 5/2020
WO 2019161293 A1 8/2019

OTHER PUBLICATIONS

"Development of a remote telemetry and diagnostic system for electric vehicles and electric vehicle supply equipment" Published by IEEE (Year: 2013).*
(Continued)

*Primary Examiner* — Zeina Elchanti
(74) *Attorney, Agent, or Firm* — Joseph Zane; Brooks Kushman, P.C.

(57) ABSTRACT

An electric vehicle supply equipment (EVSE) tracking device includes a communication device attached to a first EVSE configured to receive and transmit data. The EVSE tracking device also includes a computing device configured to store a shipment roaster including EVSE data that uniquely identifies the first EVSE and at least one other EVSE packaged with the first EVSE; transmit, via the communication device, the EVSE data associated with the first EVSE as part of an EVSE check-in process that is periodically executed; detect an EVSE check-in total based on the EVSE data received via the communication device; and execute an EVSE misplacement operation in response to the EVSE check-in total indicating a missing EVSE based on the shipment roaster.

20 Claims, 4 Drawing Sheets

(56) References Cited

U.S. PATENT DOCUMENTS

| | | | | |
|---|---|---|---|---|
| 2020/0180719 | A1* | 6/2020 | Chadwick | B62J 50/22 |
| 2020/0265488 | A1* | 8/2020 | Dhingra | G08G 1/202 |
| 2021/0035032 | A1* | 2/2021 | Foley | G06Q 10/02 |
| 2021/0125499 | A1* | 4/2021 | Cooper | G06Q 30/0645 |
| 2021/0213847 | A1* | 7/2021 | Sun | B60L 53/65 |
| 2022/0181887 | A1 | 6/2022 | Baldasare et al. | |
| 2022/0379761 | A1* | 12/2022 | Jang | B60L 53/126 |
| 2024/0067031 | A1 | 2/2024 | Meroux et al. | |

OTHER PUBLICATIONS

Boehm, J., Bhargava, H.K., and Parker, G.G., "The Business of Electric Vehicles: A Platform Perspective," Foundations and Trends in Technology, Information and Operations Management: vol. 14, No. 3, pp. 203-323.
Westland, J.C., Clark, T.H., "Logistics and Service Opportunities and Issues," Chapter 11 of Global Electronic Commerce: Theory and Case Studies, The MIT Press, 1999, pp. 529-555.
Yang, Z. et al., "Evaluation of Smart Response Systems for City Emergencies and Novel UV-Oriented Solution for Integration, Resilience, Inclusiveness and Sustainability," 2020 5th International Conference on Universal Village—UV2020—Session 12B-4.

* cited by examiner

SYSTEM AND METHOD OF TRACKING MULTIPLE ELECTRIC VEHICLE SUPPLY EQUIPMENT IN A SHIPMENT

TECHNICAL FIELD

The present disclosure generally relates to tracking an electric vehicle supply equipment (EVSE) for charging electric vehicles prior to installation.

BACKGROUND

The statements in this section merely provide background information related to the present disclosure and may not constitute prior art.

Electric vehicles (EVs), such as plug-in hybrid or fully electric, generally use an electric vehicle supply equipment (EVSE) to charge a battery pack of the EV. With growing number of EVs and the time it can take to charge the battery pack, charge depots having multiple EVSEs at a location are being formed at various areas such as at commercial buildings and/or public parking.

The EVSEs employed for the charge depot are ordered in advance and shipped to the location well in advance. Accordingly, the EVSEs can be stored at the location waiting for the installation date.

SUMMARY

This section provides a general summary of the disclosure and is not a comprehensive disclosure of its full scope or all of its features.

In some aspects, the present disclosure is directed to an electric vehicle supply equipment (EVSE) tracking device that includes a communication device attached to a first EVSE configured to receive and transmit data. The EVSE tracking device also includes a computing device configured to store a shipment roster including EVSE data that uniquely identifies the first EVSE and at least one other EVSE packaged with the first EVSE; transmit, via the communication device, the EVSE data associated with the first EVSE as part of an EVSE check-in process that is periodically executed; detect an EVSE check-in total based on the EVSE data received via the communication device; and execute an EVSE misplacement operation in response to the EVSE check-in total indicating a missing EVSE based on the shipment roster.

In some aspects, the present disclosure is directed to a method that includes storing, by an electric vehicle supply equipment (EVSE) tracking device provided with a first EVSE, a shipment roster including EVSE data that uniquely identifies the first EVSE and at least one other EVSE packaged with the first EVSE. The method also includes transmitting, by the EVSE tracking device, the EVSE data associated with the first EVSE as part of an EVSE check-in process that is periodically executed, detecting, by the EVSE tracking device, an EVSE check-in total based on the EVSE data received from the at least one other EVSE, and executing, by the EVSE tracking device, an EVSE misplacement operation in response to the EVSE check-in total indicating a missing EVSE based on the shipment roster to notify a remote server of the missing EVSE.

In some aspects, the present disclosure is directed to an electric vehicle supply equipment (EVSE) tracking device that includes a communication device attached to a first EVSE configured to receive and transmit data. The EVSE tracking device further includes a computing device configured to: store a shipment roster including EVSE data that uniquely identifies the first EVSE and at least two other EVSE packaged with the first EVSE; transmit, via the communication device, the EVSE data associated with the first EVSE as part of an EVSE check-in process that is periodically executed; detect an EVSE check-in total based on the EVSE data received via the communication device; activate the first EVSE to emit a shipment separation message indicating the first EVSE is a missing EVSE in response to the EVSE check-in total being less than or equal to a first response threshold; and transmit a missing EVSE notification via the communication device to identify at least one EVSE of the at least two other EVSEs that has not transmitted the EVSE data as a missing EVSE in response to an EVSE check-in total detected and transmitted from at least one of the at least two other EVSEs is equal to the EVSE check-in total detected by the first EVSE Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

At times, when a shipment of EVSEs is received, the shipment may include all of the ordered EVSEs. However, as the shipment waits for installation, an EVSE may go missing (e.g., misplaced or stolen).

The present disclosure is directed to system/method of tracking multiple EVSE using an EVSE tracking device provided at each EVSE. In a non-limiting example, each EVSE tracking device is configured to communication with other EVSE tracking devices using wireless communication. The EVSE tracking devices is configured to store a shipment roster that includes EVSE data that uniquely identifies the respective EVSE and the other EVSEs packaged with the respective EVSE. Periodically, the EVSE tracking devices are configured to transmit EVSE data associated with the respective EVSE as part of an EVSE check-in process, and detect an EVSE check-in total based on the EVSE data received from other EVSE tracking devices. The EVSE tracking device may execute an EVSE misplacement operation in response to the EVSE check-in total indicating a missing EVSE based on the shipment roster. With the EVSE tracking device, the system/method of the present disclosure may monitor shipments of EVSEs as they await installation and notify identified parties like the sender of the EVSE shipment of a missing EVSE.

Figure 1:
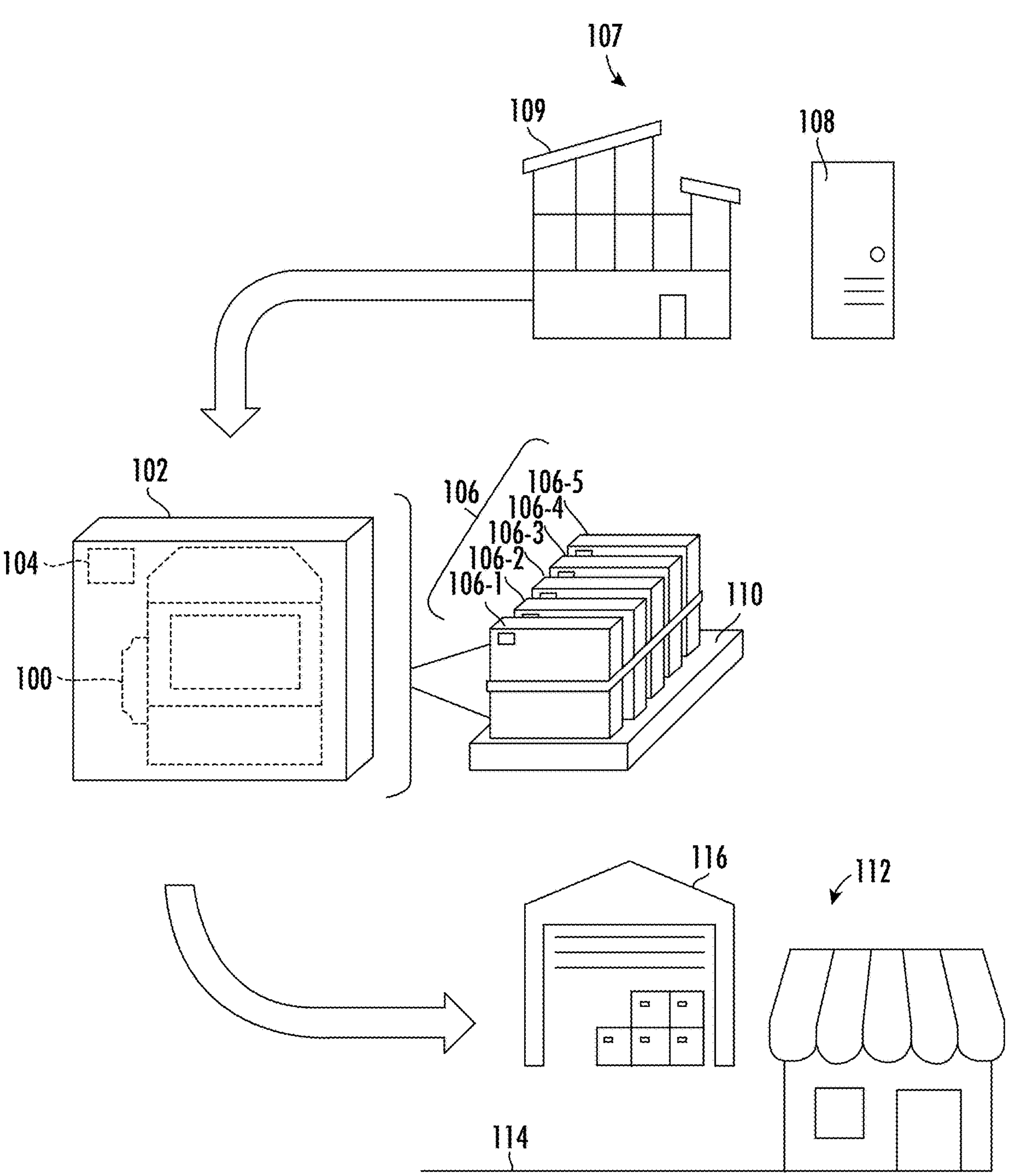
FIG. 1 illustrates a pallet of EVSEs for shipment to a designated location.

Referring to FIG. 1, an EVSE 100 is packaged in a carton 102 with an EVSE tracking device 104 forming an EVSE parcel 106. While the EVSE parcel 106 is described as having the carton 102, other suitable shipping techniques may be employed (e.g., polymer wrapping). In addition, the present disclosure is applicable in implementations in which the EVSE parcel 106 just includes the EVSE 100 and the EVSE tracking device 104.

In some aspects, an EVSE service system 107 manages and processes orders for one or more EVSEs 100. In one form, the EVSE service system 107 includes a server 108 and a facility 109 that stores EVSEs 100 and prepares the EVSE 100 for shipment. The server 108 is configured to communicate with various external devices/systems using long and/or short range communication networks, and to process orders for one or more EVSEs 100. The server 108 may be a cloud based server accessible by technicians of the facility 109 via computing devices.

In a non-limiting example, the EVSE service system 107 receives an order for EVSEs 100 from a customer that is to install the EVSEs 100 at a designated location 114 (e.g., a parking lot). Based on the order, the EVSE service system 107 identifies one or more EVSEs 100 to be provided from the facility 109, and tracks the shipment of the EVSEs 100. For instance, once identified, the EVSE parcels 106 (e.g., parcels 106-1 to 106-5) having the identified EVSEs 100 are placed on a pallet 110, which is to be delivered to an identified address (e.g., a store 112). As part of the order processing practice, the EVSE service system 107 is configured to store information related to the EVSEs 100, the parcels 106, and the tracking devices 104, such as but not limited to: unique identification (ID) associated with the identified EVSEs 100; unique ID associated with the EVSE tracking devices 104 and the EVSE 100 associated with the tracking device 104; total number of EVSE parcels 106 provided in the shipment (e.g., EVSE parcel total); unique ID associated with the parcel 106; shipment date; and/or tracking number associated with the shipment having the pallet 110.

The EVSE service system 107 may obtain detail locational information of the pallet 110 from, for example, a shipping entity in charge of delivering the pallet 110. As described herein, the EVSE service system 107 may obtain information related to the individual EVSE parcels 106 based on a message provided one or more of the EVSE tracking devices 104. Specifically, after delivery, the pallet 110 of the EVSE parcels 106 may be stored at, for example, a storage unit 116. From the time the pallet 110 is shipped to the time the EVSE 100 are installed, the placement of individual EVSEs 100 can be monitored by the EVSE service system 107 using the EVSE tracking devices 104, as detailed below.

Figure 2:
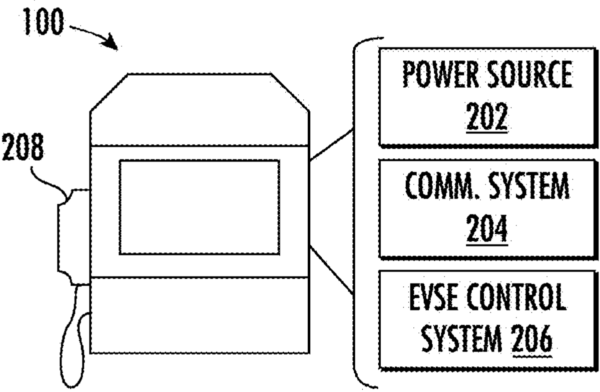
FIG. 2 is an example block diagram of an EVSE.

The EVSE 100 is operable to charge a battery pack of an EV (not shown), and with multiple EVSEs 100 at the designated location, multiple EVs may be charged by the EVSEs 100. Referring to FIG. 2, in a non-limiting example, the EVSE 100 includes a power source 202, a communication system 204, and an EVSE control system 206. The power source 202 is a low DC power source (e.g., a 12V battery) for providing power to low voltage components within the EVSE 100, such as electronics of the communication system 204 and the EVSE control system 206.

The communication system 204 is configured to communicably couple the EVSE 100 to one or more wireless network and exchange messages with other systems/devices via short- and/or long-range communication. In a non-limiting example, the communication system 204 may employ wireless communication protocols such as: Wi-Fi, cellular, BLUETOOTH, and/or ultra-wideband (UWB)), and may include communication devices such as, but not limited to, antenna, transceiver, router, and/or software protocols executed by a processor. In some aspects, the communication system 204 is configured to transfer messages from one device (e.g., the EVSE tracking device 104) to another device using different communication networks. For example, as described herein, the communication system 204 receives a message from the EVSE tracking device 104, via short range communication network, to transmit a message to the system 107 via a long rang communication network.

Once the EVSE 100 is installed and operational, the EVSE control system 206 is configured to manage transfer of electrical energy between an external power source (e.g., power grid) and the EV. In a non-limiting example, the EVSE 100 is connected to a charge port of the EV via an EVSE connector 208 and includes power converters to condition power supplied to the EV.

At times, the EVSEs 100 are stored for days and even months prior to being installed at the designated location 114. In some aspects the EVSE tracking devices 104 are configured to communicate with one another to periodically perform an EVSE check-in process during which each EVSE tracking device 104 determines whether each EVSE parcel 106 is present, and in the event an EVSE parcel 106 is missing, one or more of the EVSE parcels 106 perform an EVSE misplacement operation.

Figure 3:
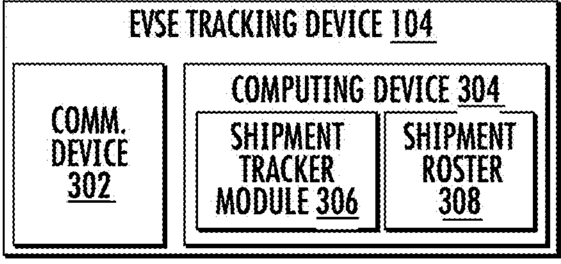
FIG. 3 is an example block diagram of an EVSE tracking device.

Referring to FIG. 3, in some aspects, the EVSE tracking device 104 includes a communication (Comm.) device 302 and a computing device 304 configured to operate as a shipment tracker module 306 and store a shipment roster 308. In a non-limiting example, the computing device 304 includes one or more memory devices and one or more processor circuits that executes codes stored in the one or more memory devices and configured to perform the operation of the shipment tracker module 306 as described herein. The one or more memory devices is also configured to store the shipment roster 308.

The EVSE tracking device 104 may include other components, such as, a low voltage power source for powering the communication device 302 and the computing device 304.

The communication device 302 is configured to exchange messages via short-range communication. In a non-limiting example, the communication device 302 establish communication using BLUETOOTH (e.g., BLUETOOTH Low Energy (BLE)), UWB, and/or semi-passive microwave tag technologies. In some aspects, the communication device 302 is configured to communicate with other EVSE tracking devices 104 to exchange information regarding the respective parcel. In addition, the communication device 302 is configured to transmit messages to the communication system 204, thereby activating and having the communication system 204 transmit messages to other devices that are outside the communication range of the EVSE tracking device 104, such as the system 107.

The shipment tracker module 306 is configured to execute an EVSE check-in process to determine whether the EVSE 100 having the tracking device 104 and/or another EVSE 100 of the shipment is missing from the pallet 110. Specifically, the EVSE tracking device 104 of each EVSE parcel 106 knows the other EVSEs 100 being shipped and based on the messages exchanged among the tracking devices 104 determines whether an EVSE 100 is missing.

Figure 4:
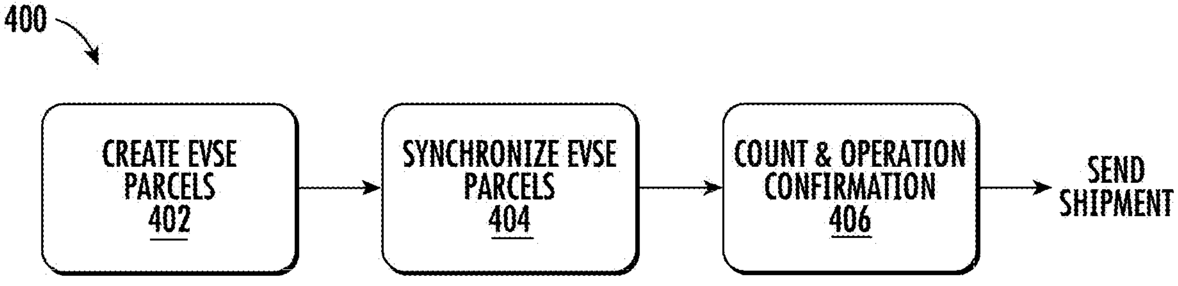
FIG. 4 is a flow diagram for synchronizing the EVSE tracking devices of a shipment.

In preparing the shipment of EVSE parcels 106, the EVSE parcels 106 undergo a packaging synchronization process to define the shipment roster 308 and synchronize execution of the EVSE check-in process across the EVSE tracking devices 104. Referring to FIG. 4, in a non-limiting example, a packaging synchronization process 400 is performed at the EVSE service system 107 with assistance of technicians accessing the server 108.

At step 402, EVSE parcels 106 are created for a selected order by, for example, packaging identified EVSEs 100 for the order with respective EVSE tracking devices 104 having a unique ID. The EVSE service system 107 stores information associating each EVSE 100 with its respective EVSE tracking device 104 to be used to identify the EVSE 100 based on the ID of the EVSE tracking device 104 or vice versa. The EVSE tracking device 104 may be packaged with the EVSE 100 in various suitable ways, such as but not limited to: attached to the EVSE 100 and removeable if desired or arranged in the carton 102 and unattached to the EVSE 100.

At step 404, once all EVSE parcels 106 are created, the parcels 106 are synchronized with one another. For example, the shipment roster 308 for the order is stored in each EVSE tracking device 104. The shipment roster 308 includes information related to the shipment, such as but not limited to, at least one of: an EVSE parcel total indicating total number of EVSEs provided in the shipment; EVSE ID that identifies the EVSE; EVSE ID of other EVSE 100 in the shipment; and ID associated with each EVSE tracking device 104 of the shipment. In addition to the shipment roster 308, the EVSE tracking devices 104 are temporally synchronized to have the EVSE tracking devices 104 execute the EVSE check-in process at the same time, so that the computing devices 304 of the EVSE tracking devices 104 are activated and exchange messages at the same time. The frequency at which the EVSE check-in is performed may be based on the voltage of the power source of the EVSE tracking device 104 and the desired operation life of the EVSE tracking device 104 (e.g., 1 yr of operation). Accordingly, the EVSE check-in process may be periodically performed (e.g., twice a week, once a week, once every other week).

At step 406, a test count is performed by each tracking device 104 to confirm operation. For example, each tracking device 104 performs the EVSE check-in process and transmits a results to each other and/or to the EVSE service system 107. In some variations, each EVSE tracking device should obtain messages from the other EVSE tracking devices 104, and confirms at least one of the EVSE parcel total or the ID of the tracking devices 104 with the information in the shipment roster 308. If all EVSEs tracking devices 104 are confirmed by each of the EVSE tracking devices 104, the shipment may be sent for delivery. Conversely if an EVSE tracking device 104 outputs the wrong EVSE parcel total or is not able to confirm the ID of each EVSE tracking device 104, the shipment is not ready for delivery and additional setup may be needed.

Figure 5:
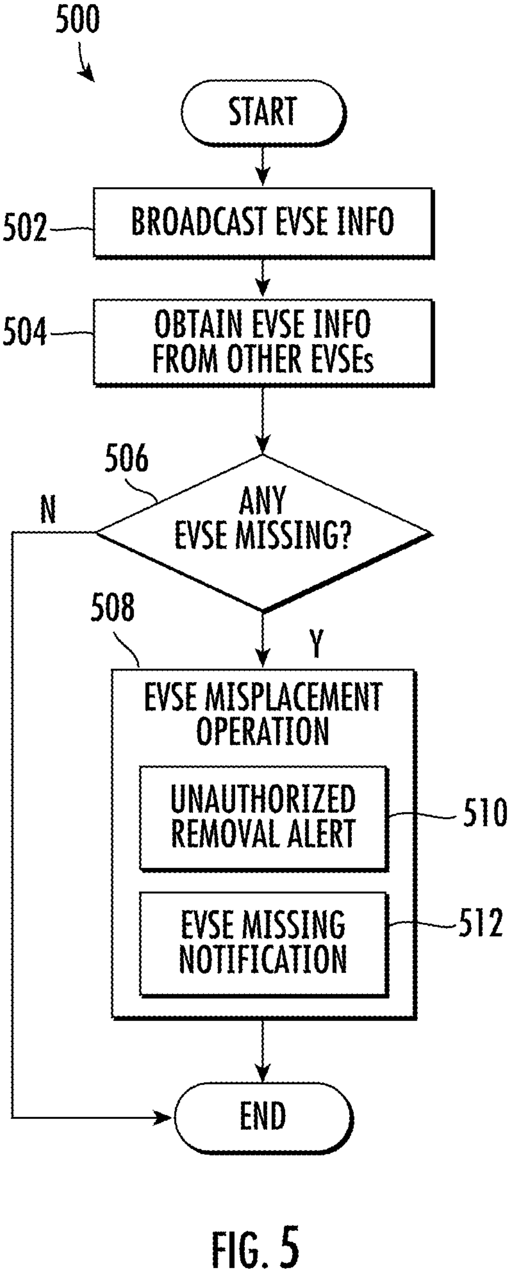
FIG. 5 is a flowchart of an example EVSE check-in routine.

Once ready for shipment, each EVSE tracking device 104 through respective shipment tracker module 306 periodically performs the EVSE check-in process. Referring to FIG. 5, an example EVSE check-in routine 500 is provided and performed at the frequency set during synchronization system.

At operation 502, the EVSE tracking device 104 broadcasts or transmits EVSE information (e.g., EVSE data) that uniquely identifies a respective EVSE 100 having the EVSE tracking device 104. In a non-limiting example, the EVSE information may include the unique ID associated with the EVSE tracking device 104.

At operation 504, the EVSE tracking device 104 obtains EVSE information from other EVSE tracking devices 104. In some aspects, the EVSE tracking device 104 stores the EVSE information received in a log along with an EVSE check-in total indicating the total number of EVSEs 100 or more specifically, the EVSE tracking devices 104 that transmitted information.

At operation 506, the EVSE tracking device 104 determines if an EVSE 100 or stated differently, an EVSE parcel 106 is missing. In a non-limiting example, the EVSE tracking device 104 determines if the EVSE check-in total is the same as the EVSE parcel total in the shipment roster 308. If it is the same, no EVSE 100 is missing, and the process ends until the next check-in.

Alternatively, if the values are different, the EVSE tracking devices 104 determines an EVSE 100 is missing and at operation 508, performs an EVSE misplacement operation. For example, at operation 508, the EVSE check-in process is configured to determine if the EVSE check-in total is less than or equal to a first threshold to determine if the EVSE 100 associated with the respective EVSE tracking device 104 is misplaced or removed from the shipment. Accordingly, the first threshold may be equal to 1 or even zero, such that if no EVSE information is received, then the EVSE 100 is removed from the shipment. In such scenario, the EVSE misplacement operation may include executing an unauthorized removal alert at operation 510 in which the EVSE 100 (e.g., the communication system 204) is woken or activated by the EVSE tracking device 104 and requested to emit a shipment separation message to the EVSE service system 107. The shipment separation message may include the ID of the EVSE tracking device 104 and/or the EVSE 100 and indicates that the EVSE 100 was removed or stated differently, is the missing EVSE 100.

If the EVSE check-in total is greater than the first threshold, the EVSE tracking device 104 is configured to identify the missing EVSE 100 based on the shipment roster 308 and the EVSE information from other EVSE tracking devices 104. Once identified, the EVSE misplacement operation may include emitting or transmitting an EVSE missing notification at operation 512 to the EVSE service system 107. For example, the EVSE tracking device 104 wakens the communication system 204 and has the communication system 204 transmit a missing EVSE message that includes the ID of the EVSE tracking device 104 that did not transmit EVSE information and is associated with the missing EVSE 100. The missing EVSE message may also include the EVSE ID of the missing EVSE 100.

In lieu of each EVSE tracking device 104 contacting the EVSE service system 107, a preidentified primary EVSE tacking device 104 transmits the alert to the system 107, at 512. The primary EVSE tracking device 104 may be selected at the time of packaging of process 400, and during that time one or more secondary EVSE tracking devices 104 maybe identified in the event the primary EVSE tracking device 104 is missing.

After operation 508 or if no EVSE 100 is missing, the EVSE tracking device 104 enters a sleep or low power mode to conserve power until the next EVSE check-in process.

Figure 6:
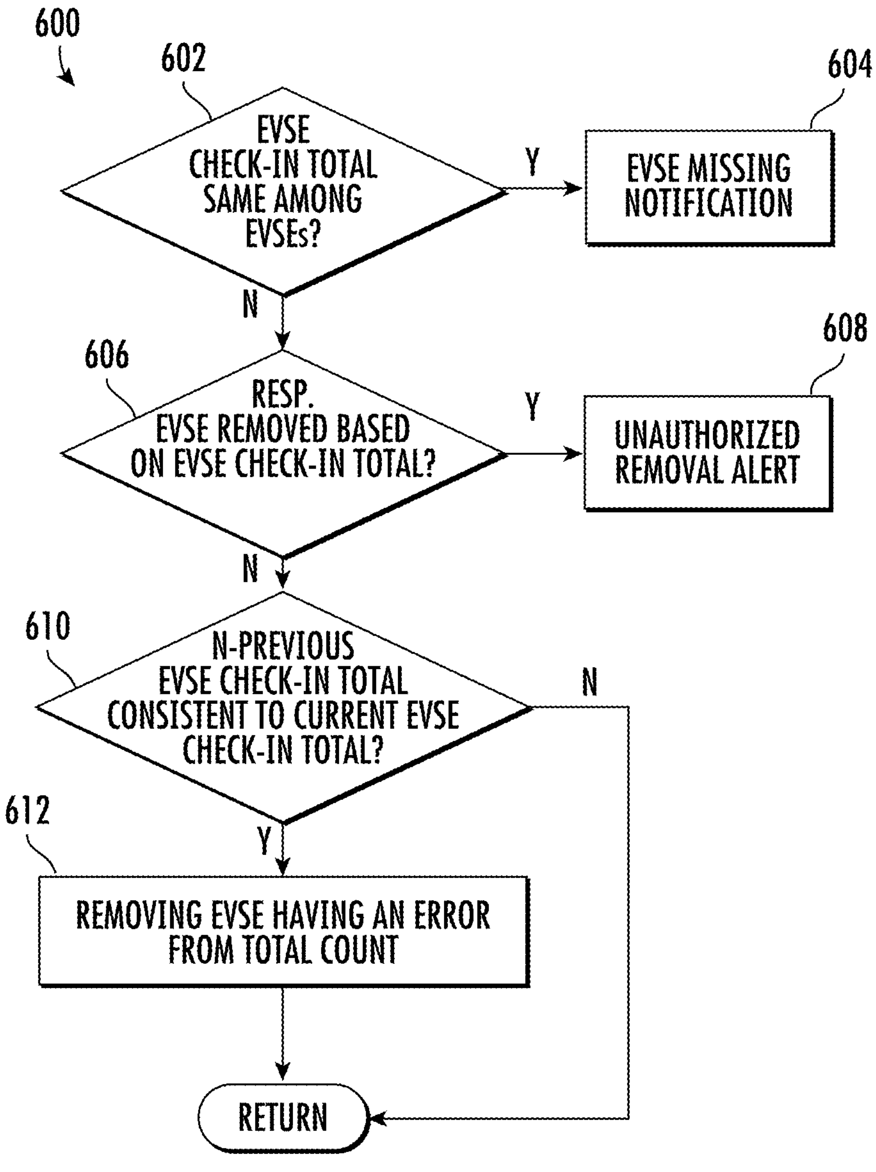
FIG. 6 is a flowchart of an example check-in analysis for the EVSE check-in routine of FIG. 5.

The EVSE check-in process may be configured in other suitable ways for detecting a missing EVSE 100. In a non-limiting example, referring to FIG. 6, an example check-in analysis routine 600 performed in lieu of the EVSE misplacement operation 508 is provided. The routine 600 is performed when an EVSE is detected as missing based on the EVSE check-in total not being the same as the EVSE parcel total at operation 506 of FIG. 5

At operation 602, the EVSE tracking device 104 determines if the EVSE check-in total is the same among the EVSE tracking devices 104 or, stated differently, among the EVSEs 100. That is, each EVSE tracking device 104 transmits its determined EVSE check-in total to the other tracking devices 104. If the totals are the same, then the EVSE tracking devices 104 recognizes the same EVSE 100 as missing, and identifies the missing EVSE using the shipment roster 308. The EVSE tracking device 104 transmits the EVSE missing notification at operation 604, which may be the same as operation 512 of FIG. 5.

In the event the EVSE check-in total is not the same among the EVSEs 100, at operation 606, the EVSE tracking device 104 determines if the respective EVSE 100 was removed from the shipment based on the EVSE check-in total. Similar to the operation 508, the operation 606 may compare the EVSE check-in total to a threshold value that indicates that the respective EVSE parcel 106 was removed (e.g., threshold may be one or zero). The threshold may also be provided as being a percentage of the EVSE parcel total. For instance, at operation 606, the EVSE tracking device is configured to determine if the EVSE check-in total is less than or equal to 20% of possible reportable EVSEs 100.

If the respective EVSE 100 is missing, the EVSE tracking device 104 is configured to perform the unauthorized removal alert at operation 608, which is the same as the operation 510 of FIG. 5.

If the respective EVSE 100 is not removed/missing from the shipment, the EVSE tracking device 104 is configured to determine if the previous EVSE check-in totals are consistent. That is, at operation 610, the EVSE tracking device 104 is configured to compare results of N-previous EVSE check-in processes (e.g., 5 previous EVSE check-ins). If the values are consistent and show that one of the EVSEs 100 reports the same EVSE check-in total that is different from other EVSE check-in totals, the EVSE tracking device 104 identifies that tracking device 104 as having an error. In such instances, no EVSEs 100 may be missing and the EVSE tracking device 104 having the error may be disregarded for purpose of determining a missing EVSE. The EVSE tracking device 104 having the error may then be removed, at operation 612, for purposes of determining a missing (e.g., operation 602). In some variations, a message may be transmitted to the EVSE service system 107 identifying the EVSE tracking device 104 having the error.

If the information is not consistent, the routine 600 returns to the end of FIG. 5 to perform another EVSE check-in process when appropriate.

In receiving the EVSE missing notification or the unauthorized removal alert, the EVSE service system 107 is configured to notify the recipient of the shipment that the EVSE parcel 106 having the EVSE 100 is missing, and can dispatch technicians to look for the EVSE parcel 106. The EVSE missing notification and/or the EVSE unauthorized removal alert may include information to identify the EVSE 100 missing such as the ID associated with the EVSE tracking device 104 and/or the ID associated with the EVSE 100 itself. Other EVSE service system 107 may perform other remedial actions, and is not limited to those described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, components like the EVSE tracking device 104 having the shipment tracker module 306 and/or server 108, may be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory device is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a USB, CD, a DVD, or a Blu-ray Disc).

The apparatuses and methods described in this application (e.g., the EVSE tracking device 104 and/or server 108) may be partially or fully implemented by a special purpose computer created by configuring a general-purpose computer (e.g., computing device) to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric vehicle supply equipment (EVSE) tracking device to be attached at a first EVSE, comprising:

a communication device configured to receive and transmit data using a wireless communication link; and a computing device configured to:

store a shipment roster including EVSE data that uniquely identifies the first EVSE and at least one other EVSE packaged with the first EVSE;

periodically execute an EVSE check-in process, wherein for each EVSE check-in process, the computing device is configured to:

broadcast, using the communication device, a check-in signal including the EVSE data associated with the first EVSE;

determine whether an EVSE check-in total indicates a missing EVSE, wherein the EVSE check-in total is total number of EVSE from among the at least one other EVSE that checked-in based on the EVSE data received by the communication device;

execute an EVSE misplacement operation in response to the EVSE check-in total being determined to indicate the missing EVSE based on the shipment roster; and enter a power conservation state in response to the EVSE check-in total not indicating the missing EVSE with the EVSE check-in total being same as an EVSE parcel total provided in the shipment roster.

2. The EVSE tracking device of claim 1, wherein the EVSE data includes a unique ID associated with the first EVSE.

3. The EVSE tracking device of claim 1, wherein the computing device is configured to:

determines that the first EVSE is separated from the at least one other EVSE in response to the EVSE check-in total being less than or equal to a first response threshold, and as the EVSE misplacement operation, activate the first EVSE to emit a shipment separation message indicating the first EVSE is the missing EVSE.

4. The EVSE tracking device of claim 1, wherein:

the at least one other EVSE includes at least two other EVSEs, and the computing device is configured to:

determine that at least one EVSE of the at least two other EVSEs is the missing EVSE in response to the EVSE check-in total being same as that received from one or more of the at least two other EVSEs; and transmit, using the communication device, a missing EVSE notification, as the EVSE misplacement operation, to notify a remote server of the missing EVSE.

5. The EVSE tracking device of claim 4, wherein the computing device is further configured to activate the first EVSE and instruct the first EVSE to transmit the missing EVSE notification, the missing EVSE notification includes the EVSE data of the missing EVSE obtained based on the shipment roster and the EVSE data received during the periodic EVSE check-in process.

6. The EVSE tracking device of claim 1, the EVSE parcel total is total number of EVSE provided in a shipment including the first EVSE and the at least one other EVSE.

7. The EVSE tracking device of claim 1, wherein the computing device is configured to, as the power conservation state, enter a low power mode until a subsequent EVSE check-in process.

8. A system for tracking a shipment having a plurality of EVSEs comprising a plurality of the EVSE tracking devices of claim 1, wherein each EVSE tracking device is provided with a selected EVSE among the plurality of EVSEs, the selected EVSE being the first EVSE for the EVSE tracking device and other EVSE among the plurality of EVSEs being the at least one other EVSE.

9. A method, comprising:

storing, by an electric vehicle supply equipment (EVSE) tracking device attached to a first EVSE, a shipment roster including EVSE data that uniquely identifies the first EVSE and at least one other EVSE packaged with the first EVSE;

periodically executing, by the EVSE tracking device, an EVSE check-in process, wherein for each EVSE check-in process:

broadcasting a check-in signal including the EVSE data associated with the first EVSE;

determining whether an EVSE check-in total indicates a missing EVSE, wherein the EVSE check-in total is total number of EVSE from among any of the at least one other EVSE that checked-in;

executing an EVSE misplacement operation to notify a remote server of the missing EVSE in response to the EVSE check-in total being determined to indicate the missing EVSE based on the shipment roster; and entering a power conservation state in response to the EVSE check-in total not indicating the missing EVSE with the EVSE check-in total being same as an EVSE parcel total provided in the shipment roster.

10. The method of claim 9, wherein the EVSE data includes a unique ID associated with the first EVSE.

11. The method of claim 9, further comprising:

determining, by the EVSE tracking device, that the first EVSE is separated from the at least one other EVSE in response to the EVSE check-in total being less than or equal to a first response threshold; and activating, by the EVSE tracking device as the EVSE misplacement operation, the first EVSE to emit a shipment separation message indicating the first EVSE is the missing EVSE.

12. The method of claim 9, wherein the at least one other EVSE includes at least two other EVSEs, and the method further includes:

determining, by the EVSE tracking device, that at least one EVSE of the at least two other EVSEs is the missing EVSE in response to the EVSE check-in total being same as that received from one or more of the at least two other EVSEs; and transmitting, by the EVSE tracking device as the EVSE misplacement operation, a missing EVSE notification to notify a remote server of the missing EVSE in response to the missing EVSE being the at least one EVSE of the at least two other EVSEs.

13. The method of claim 12, further comprising, as part of the EVSE misplacement operation:

activating, by the EVSE tracking device, the first EVSE; and instructing, by the EVSE tracking device, the first EVSE to transmit the missing EVSE notification, the missing EVSE notification includes the EVSE data of the missing EVSE obtained based on the shipment roster and the EVSE data received during the EVSE check-in process.

14. The method of claim 12, further comprising, as part of the EVSE misplacement operation:

activating, by a primary EVSE tracking device, a primary EVSE associated with the primary EVSE tracking device, wherein the primary EVSE is one of the at least one EVSE of the at least two other EVSEs; and instructing, by the primary EVSE tracking device, the primary EVSE to transmit the missing EVSE notification, the missing EVSE notification includes the EVSE data of the missing EVSE obtained based on the shipment roster and the EVSE data received during the EVSE check-in process.

15. The method of claim 9, wherein the EVSE parcel total is total number of EVSE provided in a shipment including the first EVSE and the at least one other EVSE.

16. The method of claim 9, further comprising entering, by the EVSE tracking device as the power conservation state, a low power mode until a subsequent EVSE check-in process.

17. The method of claim 9, further comprising removing, by the EVSE tracking device, an identified EVSE having an erroneous EVSE check-in total for future EVSE check-in processes when determining an EVSE is missing.

18. An electric vehicle supply equipment (EVSE) tracking device to be attached at a first EVSE, comprising:

a communication device configured to receive and transmit data;

a computing device configured to:

store a shipment roster including EVSE data that uniquely identifies the first EVSE and at least two other EVSE packaged with the first EVSE;

periodically execute an EVSE check-in process, wherein for each EVSE check-in process, the computing device is configured to:

broadcast, using the communication device, a check-in signal including the EVSE data associated with the first EVSE;

determine whether an EVSE check-in total indicates a missing EVSE, wherein the EVSE check-in total is total number of EVSE from among any of the at least two other EVSE that checked-in based on the EVSE data received by the communication device;

entering a power conservation state in response to the EVSE check-in total not indicating the missing EVSE with the EVSE check-in total being same as an EVSE parcel total provided in the shipment roster; and in response to the EVSE check-in total indicating the missing EVSE:

activate the first EVSE to emit a shipment separation message indicating the first EVSE is the missing EVSE in response to the EVSE check-in total being less than or equal to a first response threshold; and transmit a missing EVSE notification to identify at least one EVSE of the at least two other EVSEs that has not transmitted the EVSE data as the missing EVSE in response to the EVSE check-in total being the same as that of an EVSE check-in total from one or more of the at least two other EVSEs.

19. The EVSE tracking device of claim 18, wherein, to transmit the missing EVSE notification, the computing device is further configured to activate the first EVSE and instruct the first EVSE to transmit the missing EVSE notification, the missing EVSE notification includes the EVSE data of the missing EVSE obtained based on the shipment roster and the EVSE data received during the periodic EVSE check-in process.

20. The EVSE tracking device of claim 18, the EVSE parcel total is total number of EVSE provided in a shipment including the first EVSE and the at least two other EVSE.

* * * * *